Oct. 29, 1940.  B. GERNHARDT  2,219,772
METHOD FOR TREATING FOOD
Filed Aug. 10, 1937
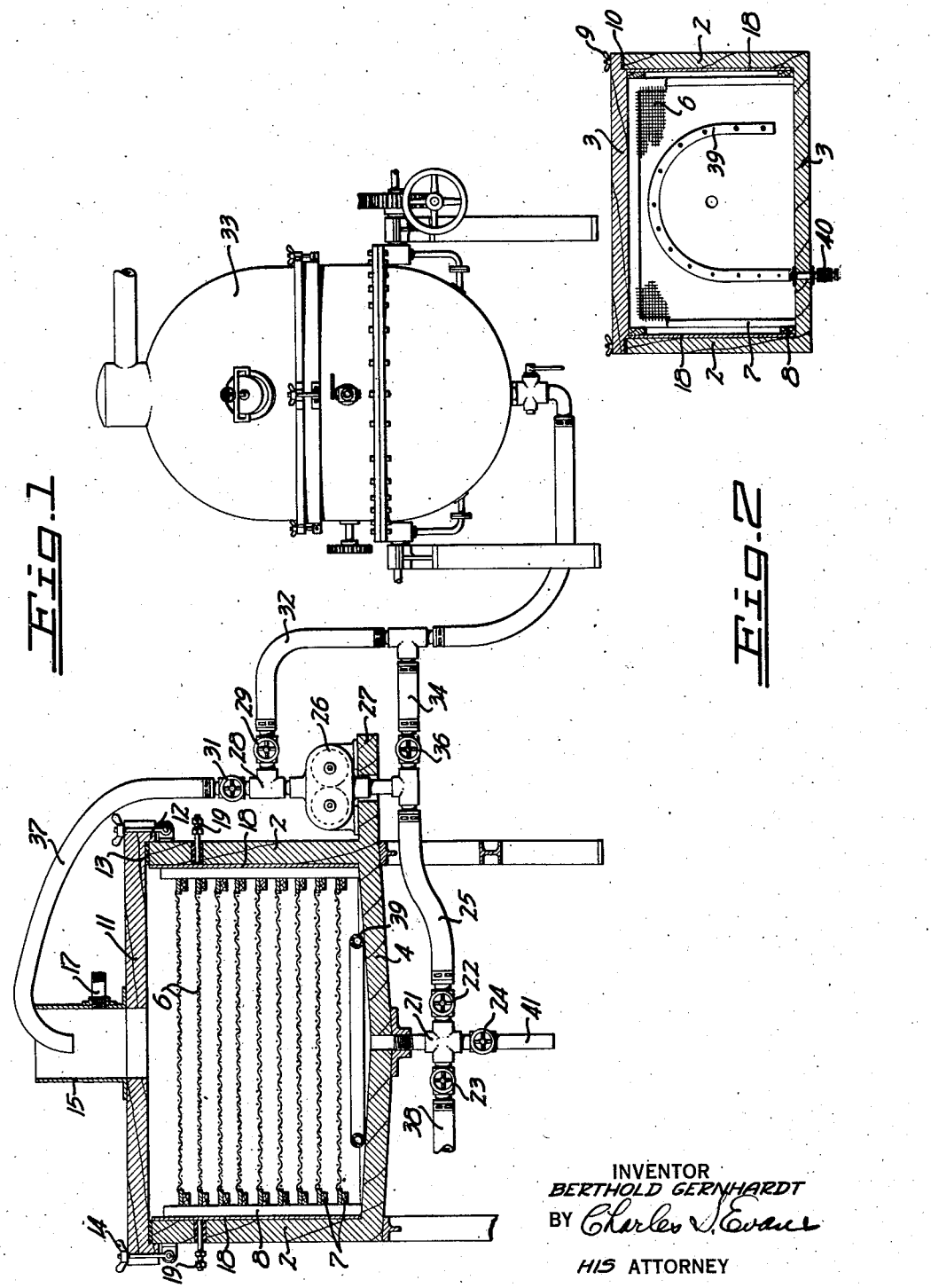
INVENTOR
BERTHOLD GERNHARDT
BY Charles J. Evans
HIS ATTORNEY Patented Oct. 29, 1940

2,219,772

UNITED STATES PATENT OFFICE 2,219,772

METHOD FOR TREATING FOOD

Berthold Gernhardt, San Francisco, Calif.

Application August 10, 1937, Serial No. 158,320

4 Claims. (Cl. 99—233)

My invention relates to the treating of foods by impregnation with a preservative or other treating material, such as sugar or salt; and the broad object of my invention is to provide an improved method and apparatus for treating the food to effect the impregnation in shorter time and at less expense, and to produce a food product which is clear and bright and which retains all the natural flavors of the original food substance.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a diagrammatic view, partly in section and partly in elevation, showing apparatus embodying the improvements of my invention; and Figure 2 is a transverse horizontal sectional view of the treating vessel.

For many years foods have been preserved by impregnating with preservative materials, such as sugar and salt. The principle here is that if a food is placed in a solution of sugar or salt, the dissolved preservative material passes through the cell walls by osmosis and becomes concentrated in the fruit cells. In the treatment of fruits, the practice has been to cook the fruit in a sugar solution, relying upon the heat, and sometimes also pressure, to promote the passage of the sugar into the fruit cells. This process takes many days to complete, and involves equipment which is expensive to install and operate. Furthermore, the long cooking darkens the fruit, and substantially all the acids and natural flavors of the fruit are lost. As a result the final product is unattractive, both in appearance and taste.

In view of these disadvantages of the ordinary treating processes, it is the purpose of my invention to provide a method and apparatus by which fruit may be impregnated with sugar inexpensively and in a relatively short time, and which produces a good looking product, of light, clear color, and retaining substantially all the acids and flavors of the natural fruit. When used for pickling foods, such as meats, my process has equal advantages, and large pieces of meat may be impregnated with salt in a short time.

In terms of broad inclusion, the method of treating foods embodying my invention comprises submerging the food in a fluid containing a treating material, and then subjecting the whole to the effects of an electric current to effect the deposit of the treating material in the food. Thus in preserving foods by my process, the food is submerged in a solution of a preservative material, such as sugar or salt, and an electric current is passed through the solution. In preserving some foods with sugar, such as certain of the fruits and fruit peels, the raw fruit is preferably first cooked to soften it. Some fruits, such as the softer berries, do not require cooking at all. In the pickling of meats with salt, the raw meat is preferably treated without cooking. When fruits are preserved with sugar, the treatment is preferably started with a solution of predetermined concentration, and the concentration increased as the process progresses.

The invention also includes apparatus for carrying out the method, comprising broadly a vessel for receiving the food and the solution of treating material, and means for passing an electric current through the solution in the vessel. Means are also provided for heating water in the vessel to cook the food, and means are provided for introducing and withdrawing solutions from the vessel. Means are also preferably provided for circulating the solution in the vessel.

In greater detail, and referring to the drawing, the apparatus embodying my invention comprises a treating vessel or tank having end walls 2, side walls 3 and a bottom 4. This vessel holds the food to be treated and the fluid or liquid containing the treating material, and is of electrically non-conducting material, such as wood. A hard wood, such as white beech, which will not impart flavor to the food being treated, is preferably used. The treating vessel is preferably of comparatively small size, in order to facilitate handling the food; and in practice a plurality of these vessels may be provided, depending upon the capacity of the plant. I prefer to use a tank about 38 inches wide, 50 inches long and 30 inches deep.

The food to be treated is supported in the vessel by a series of trays 6, held by cleats 7 across the ends of the tank and fastened to corner posts 8. The trays and supporting structure are also of electrically non-conducting material, such as cane woven across wooden frames. The vessel may be charged with food from the top, by inserting and loading one tray at a time; or the vessel may be loaded by sliding in the trays from the side. In the latter case, one of the sides 3 of the tank is made removable by providing studs and wing nuts 9, as shown in Figure 2. If the side wall is demountable, a gasket 10 is preferably provided to seal the joints.

A cover 11 is provided for the vessel, and is also preferably of wood with flanges 12 to overlap the walls of the tank. A gasket 13 is provided to seal the cover, and suitable fasteners 14 are arranged to hold the cover down. This cover has a relatively large central opening connected with a duct or chimney 15 to allow escape of steam and vapors from the vessel. A connection 17 is provided at the side of duct 16 to which a discharge hose may be connected to carry away overflow from the tank.

Means are provided for subjecting the contents of the treating vessel to the effects of an electric current. For this purpose a pair of plates or electrodes 18 are disposed adjacent the ends of the tank, and are connected to terminals 19 outside the tank, to which electrical conductors may be fastened. Plates 18 are of metal, such as Monel or stainless steel. By this arrangement an electric current may be passed through the solution in the tank. The current used for this purpose is preferably ordinary 110 v. alternating current. While any current may be used, alternating or pulsating currents are preferred, because direct current tends to foul the plates. The voltages permissible vary within wide limits, the principal limitation here being the range within which operators can work around the tanks without danger.

Means are provided for introducing and withdrawing the treating solutions from the tank; and a concentrating unit is provided for preparing the solutions. As shown in Figure 1, the bottom 4 of the tank slopes toward a central opening which communicates with a branch fitting 21 controlled by valves 22, 23 and 24. Valve 22 connects with a duct or hose 25 leading to a pump 26 mounted upon an extension 27 of the tank bottom 4. Pump 26 is one capable of pumping in either direction, such as a gear pump, and is driven by a reversible motor, not shown.

The other end of pump 26 has a branch fitting 28, controlled by valves 29 and 31. Valve 29 connects with a duct or hose 32 leading to a concentrating unit or vacuum pan 33. A by-pass duct 34 is provided around pump 26 and contains a valve 36. Unit 33 may be of any suitable construction, in which a vacuum is created to draw the solution from the treating tank through by-pass duct 34, and over into the concentrating unit. The treating or preserving material, such as sugar, is added to water in this unit to form the treating solution; and additional sugar may be added to the solution at any time to increase the concentration. Unit 33 contains the usual agitator and heating means to effect dissolving of the sugar into the solution. After a solution is prepared, it is pumped into the treating vessel by means of pump 26, with by-pass valve 36 closed.

Means are also provided for circulating the solution in the treating vessel, if such circulation is desired. For this purpose a hose 37 is connected to valve 31 and is long enough to have its end placed in the cover duct or chimney 15. By closing valves 29 and 36, and opening valve 31, and then reversing pump 26, the solution is drawn from the bottom of the tank and forced through overhead duct 37 into the top of the tank.

Means are also provided for cooking the food in the treating vessel, when such cooking is necessary. A cold water connection is provided through duct 38, connected with valve 23 at the bottom of the tank, so that water may be introduced into the tank for cooking purposes. A perforated rubber steam hose 39 is also arranged in the bottom of the tank for feeding steam directly into the cooking water. This hose preferably opens out through a side of the tank, through a valved fitting 40, to which a steam hose may be connected externally of the tank. If desired, however, the perforated steam hose may be inserted directly through the top of the tank, and removed after the cooking is finished. A discharge duct 41 is also connected to valve 24 at the bottom of the tank, for purposes of draining.

*Treating fruit.*—Some fruits are cooked for a short period at the beginning of the process, and others are not. The purpose of this preliminary cooking is to soften the fruit structure somewhat, and the cooking time therefore depends upon the character of the fruit being treated. In any event, however, the cooking required in my process is very short, and the objectional features attributed to the long periods of cooking in older processes are wholly absent. Fruits, such as strawberries, having thin skins and soft structures, do not require any cooking. The majority of the fresh fruits and peels require some cooking however. Of course, if the fruit used has already been cooked, the preliminary cooking in my tank is made unnecessary. This is true when canned fruits are used.

Taking canned pineapple as a typical example for illustrating my process, the sliced pineapple is loaded directly into the treating vessel on the trays 6. Since the canned pineapple is already cooked, the treating with sugar solution proceeds immediately. The sugar solution is prepared in unit 33 by dissolving sucrose in ordinary tap water. A solution of relatively low concentration, say about 20° Baumé, is preferably used to start with. This initial concentration may be varied within wide limits, the important thing being that the concentration is built up in steps during the process. After the solution is prepared, valves 22 and 29 are opened, and with valves 23, 31 and 36 closed, the pump 26 is operated to pump the solution from unit 33 into the treating vessel to submerge the fruit.

An ordinary 110 v. alternating potential is then impressed on plates 18 for a period of about 16 hours. This time also varies with different fruits, depending upon how long it takes the sugar to impregnate the fruit; but the 16 hour period specified for pineapple is about what is required for most fruits. The potential impressed on the plates causes a current to pass through the contents of the vessel. In a sugar solution containing fruit this current is relatively small, since a pure sugar solution is not an electrolyte; the conductivity depending upon such ionization as exists due to the dissolved salts, acids or bases existing in the tap water, or derived from the fruit. As a matter of fact, a considerable amount of fruit acid passes into the solution in the treatment of the first batch of fruit. An equilibrium is soon reached however, when no further acid leaves the fruit, or the exchange between the fruit and solution is equal. Since the solution is used again and again in subsequent batches, there is substantially no loss of acid or dissolved salts in the subsequent batches, and the fruit retains substantially all of its natural flavor.

I have found that the passage of an electric current through the solution effects a rapid deposit of the sugar in the fruit cells, as compared with the long time it takes to effect the impregnation by the customary process of cooking or allowing the fruit to stand in a sugar solution. My theory is that the more rapid deposit of sugar in the fruit cells is due to the greater molecular activity in the solution and in the fluid of the fruit cells, caused by agitated movement of the charged ions under the potential gradient across the solution.

After the current has passed through the 20° Baumé solution for the 16 hour period the circuit is opened and the solution is drawn from the tank back into concentrating unit 33. More sucrose is then added to the solution to bring the concentration up to say 30° Baumé. This solution is then pumped back into the tank, and the current is again passed through the solution for another period of about 16 hours. After this period the solution is returned to concentrating unit 33, and the concentration is brought up to its maximum of about 42° Baumé. Since the sucrose solution becomes saturated at about 36° Baumé, glucose is preferably added in amounts up to 40% of the sucrose content of the solution. The glucose retards crystallization, and permits the higher concentrations to be attained.

The final solution is then pumped back into the treating vessel, and the current again passed through the solution for another period of about 16 hours. After this treatment, the solution is again drawn back into unit 33. The pineapple is now removed from the tank and drained.

Instead of being of dark color, such as that produced by cooking in solution in the ordinary treating process, my preserved pineapple product is clear and bright. Furthermore, my product has retained in it substantially all the fruit acids and natural flavors of the fruit, whereas the product of the old processes has practically all of the flavor taken out of it. Fruits preserved by the old methods have no distinct flavors; they are just pieces of sugared cellulose, and they all taste alike. In my improved process the fruit retains its own distinct flavor, and the pineapple prepared as above described tastes like pineapple, with the full delicious flavor and aroma of the natural fruit.

Furthermore, my improved process and apparatus effects material savings in time and expense. The total treating time in the solution is about 48 hours for pineapple, as compared to many days required in old processes. Since my method is a "cold" process, the expensive heating equipment for cooking over long periods is avoided. Also the need of skilled operators for tending the long period cooking is made unnecessary, and the danger of spoiling a batch by excessive temperatures and over cooking is wholly eliminated. In my process the current consumption is low and the operating cost is practically negligible; and careful watching of the treating tanks is unnecessary.

*Treating other fruits.*—The preserving treatment above described for pineapple is applicable to most of the canned fruits. Thus, other canned fruits, such as apples, pears and apricots may be treated in the same way. With very soft fruits, such as peaches, it is preferred to use only two solutions; starting with a solution of about 30° Baumé and then using a final solution of about 42° Baumé.

When fresh fruits are used, which are not of very soft structure, the fruit is preferably cooked first for a short period. This cooking is preferably done in the treating vessel of my apparatus.

The fresh fruit is loaded into the tank, and valve 23 is opened to fill the tank with cold water. Steam is then admitted directly into the water through perforated hose 39, and the water allowed to boil until the fruit structure has softened. This cooking time is very short, usually about half an hour. The steam is then cut off, and the cooking water is carried out through overflow duct 16 by admitting more water into the bottom of the tank through valve 23. By removing the cooking water in this way the scum is carried off and not allowed to deposit on the fruit and trough structure, as would happen if the cooking water were drained out the bottom. The clear water then remaining in the tank is discharged through overflow duct 16, by admitting the sugar solution at the bottom of the tank. The sugar solution being of greater density causes the water to be lifted and discharged through the overflow duct.

Taking fresh orange peel as an example of fruit being treated, the peel is loaded into the treating vessel, and cold water is introduced. Steam is then admitted to cook the peel until the latter has softened. This usually takes about 30 minutes. Fresh water is then admitted to overflow the cooking water, and then the sugar solution is admitted to overflow the remaining water. The treating process then proceeds as described for canned pineapple.

Most fresh fruits are handled in this way. Slight variations however are sometimes desirable. Thus, for example, with some fruits, coloring matter may be added to the cooking water. Fruits having clinging pits, such as green gage plums are preferably pricked before treatment. As already pointed out, the very soft fruits, such as strawberries, do not require any cooking, and the fresh berries are treated directly with the solutions, as described for pineapple.

*Treating meats.*—Preserving meats with salt is also accomplished quickly by my improved treating process. The raw meat is placed in a suitable tank having electrodes, and a salt solution is introduced into the tank to submerge the meat. The concentration of the solution used depends upon how salty a product is desired. A sodium chloride solution of 5° Baumé is generally about right. In order to give a lastingly fresh appearance to the meat, saltpeter is preferably added in amounts up to about 1% of the sodium chloride content of the solution. An ordinary 110 v. alternating potential is then impressed on the electrodes, and the process proceeds without change of solution. The treating time varies with the size and character of the meat. Thus, pigs knuckles take about 12 hours, while a large ham takes about 72 hours.

Fish may be preserved with salt the same as meat. The fresh fish is placed directly in the salt solution and subjected to the action of the electric current; and the fish may either be sliced, split or whole. If treated whole, the fish is preferably pricked first. With some fish, such as salmon, it may be desirable to add coloring matter to the solution.

*Vegetables.*— These foods may be treated either with sugar or salt, in accordance with the teachings of my invention. In fact, any food may be treated in either way, depending upon the character of the food and how it is desired to preserve it.

The above examples are necessarily few because of the lengthy space that would be required to give the specific treatment of all foods with the various possible treating materials by my process. It is also understood that the character of treating material is not limited to preservatives such as sugar or salt, but may be any material in a fluid medium which is capable of being deposited into the food. It is further understood that the passage of a current through the contents of the treating vessel is not limited to means comprising electrodes in the solution, but may be effected by other means, such as being induced from a coil or other external source. The broad concept of my invention is that the impregnation of food with a treating material is enhanced by the effects of an electric current, whatever means might be employed to produce the current.

I claim:

1. The method of preserving foods, which comprises submerging the food in a solution of sucrose and glucose, and then passing an electric current through the solution.

2. The method of preserving fruits and the like, which comprises submerging the fruit in a sugar solution having a concentration of less than 42° Bé., passing an electric current through the solution, increasing the concentration of the solution to about 42° Bé., and then again passing a current through the solution.

3. The method of preserving fruits and the like, which comprises submerging the fruit in a sugar solution having a concentration of about 20° Bé., passing an electric current through the solution, increasing the concentration of the solution to about 30° Bé., again passing a current through the solution, then increasing the concentration of the solution to about 42° Bé., and then again passing a current through the solution.

4. The method of preserving foods, which comprises submerging the food in a sugar solution, progressively increasing the concentration of said sugar solution, and subjecting the whole to the effects of an electric current at the various concentrations.

BERTHOLD GERNHARDT.